US009820022B2

United States Patent
Wilson et al.

(10) Patent No.: US 9,820,022 B2
(45) Date of Patent: Nov. 14, 2017

(54) MANAGING NETWORK ACCESS BASED ON RANGING INFORMATION

(71) Applicant: ADTRAN INC., Huntsville, AL (US)

(72) Inventors: Arlynn W. Wilson, Huntsville, AL (US); Chad Anthony Dieselberg, Madison, AL (US); Philip David Williams, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 76 days.

(21) Appl. No.: 14/567,781

(22) Filed: Dec. 11, 2014

(65) Prior Publication Data

US 2016/0173192 A1   Jun. 16, 2016

(51) Int. Cl.
*H04B 17/00* (2015.01)
*H04Q 11/00* (2006.01)

(52) U.S. Cl.
CPC . *H04Q 11/0067* (2013.01); *H04Q 2011/0064* (2013.01)

(58) Field of Classification Search
CPC . H04Q 11/0067; H04W 64/00; H04L 63/0492
USPC .......................................................... 398/25
See application file for complete search history.

(56) References Cited

U.S. PATENT DOCUMENTS

| | | | | |
|---|---|---|---|---|
| 6,011,973 A * | 1/2000 | Valentine | .............. | H04W 48/04 342/357.59 |
| 6,978,023 B2 * | 12/2005 | Dacosta | .............. | H04L 63/0492 380/258 |
| 9,501,780 B2 * | 11/2016 | Moton, Jr. | ............ | H04W 16/00 |
| 2003/0161630 A1 * | 8/2003 | Jayaram | ............... | H04B 10/077 398/9 |
| 2004/0116129 A1 * | 6/2004 | Wilson | ................ | H04W 52/283 455/456.1 |
| 2006/0195889 A1 * | 8/2006 | Pfleging | .............. | H04L 61/2015 726/4 |
| 2008/0188243 A1 * | 8/2008 | Giustina | ............... | H04W 24/02 455/456.6 |
| 2009/0269063 A1 * | 10/2009 | Bernard | ............... | H04B 10/272 398/66 |
| 2010/0034534 A1 * | 2/2010 | Niibe | .................... | H04J 3/0682 398/25 |
| 2011/0009090 A1 * | 1/2011 | Sparks, III | ........ | H04M 1/72572 455/410 |
| 2011/0280578 A1 * | 11/2011 | Wu | ....................... | H04J 3/0682 398/67 |

(Continued)

*Primary Examiner* — Ken N Vanderpuye
*Assistant Examiner* — Amritbir Sandhu
(74) *Attorney, Agent, or Firm* — Fish & Richardson P.C.

(57) ABSTRACT

Methods, systems, and apparatus for restricting use of a network element outside an authorized location range are disclosed. In one aspect a method includes obtaining, for a network element of a passive optical network, an identifier and ranging information corresponding to a present location of the network element; identifying, from a database and based on the identifier of the network element, stored ranging information specifying a previous location of the network element; determining, based on a comparison of the ranging information with the stored ranging information, that the location of the network element has changed more than a specified amount; and outputting an alert in response to determining that the location of the network element has changed more than a specified amount.

22 Claims, 3 Drawing Sheets

(56) References Cited

U.S. PATENT DOCUMENTS

| | | | | |
|---|---|---|---|---|
| 2011/0293095 A1* | 12/2011 | Ben Ayed | ........... | H04L 63/0492 |
| | | | | 380/270 |
| 2012/0128358 A1* | 5/2012 | Zhang | ................ | H04B 10/0773 |
| | | | | 398/63 |
| 2012/0230675 A1* | 9/2012 | Zhang | .................. | H04J 3/0682 |
| | | | | 398/25 |
| 2012/0315046 A1* | 12/2012 | Lee | ................. | H04B 10/25753 |
| | | | | 398/67 |
| 2013/0223838 A1* | 8/2013 | Horishita | ............. | H04B 10/071 |
| | | | | 398/13 |
| 2014/0011509 A1* | 1/2014 | Markwart | ........... | H04W 72/082 |
| | | | | 455/452.1 |
| 2014/0089673 A1* | 3/2014 | Luna | .................. | H04L 63/0861 |
| | | | | 713/186 |
| 2014/0200929 A1* | 7/2014 | Fitzgerald | ............... | G06F 21/88 |
| | | | | 705/4 |
| 2014/0369681 A1* | 12/2014 | Smith | ................ | H04B 10/0705 |
| | | | | 398/27 |
| 2015/0244692 A1* | 8/2015 | Liu | ....................... | H04W 4/008 |
| | | | | 713/168 |
| 2015/0312738 A1* | 10/2015 | Deich | ..................... | H04W 4/22 |
| | | | | 370/328 |
| 2015/0326939 A1* | 11/2015 | Dieselberg | ......... | H04N 21/6405 |
| | | | | 725/109 |
| 2015/0341137 A1* | 11/2015 | Kaneko | ................ | H04B 10/272 |
| | | | | 398/67 |
| 2016/0226842 A1* | 8/2016 | Mower | ............... | H04L 63/0492 |
| 2016/0241937 A1* | 8/2016 | Hiscock | ............. | H04Q 11/0066 |
| 2017/0230738 A1* | 8/2017 | Fang | .................. | H04Q 11/0067 |

\* cited by examiner

MANAGING NETWORK ACCESS BASED ON RANGING INFORMATION

BACKGROUND

This specification relates to communications in a telecommunications environment.

A telecommunications network can include, for example, a fiber-optic network to provide network services to multiple subscribers at respective customer premises. Due to its high transmission capacity, immunity to electromagnetic interference, and other advantages, fiber optic networks have been widely deployed in core networks and access networks. A passive optical network (PON) is an example telecommunications network that uses fiber optic to bring fast and robust network services to homes and offices.

SUMMARY

In general, one innovative aspect of the subject matter described in this specification can be embodied in methods that include
obtaining, for a network element of a passive optical network, an identifier and ranging information corresponding to a present location of the network element; identifying, from a database and based on the identifier of the network element, stored ranging information specifying a previous location of the network element; determining, based on a comparison of the ranging information with the stored ranging information, that the location of the network element has changed more than a specified amount; and outputting an alert in response to determining that the location of the network element has changed more than a specified amount.

Another innovative aspect of the subject matter described in this specification can be embodied in a device that includes a memory storing identifiers and ranging information of at least one network element of a passive optical network; and one or more optical network devices that interact with the memory and execute instructions that cause the device to be configured to: obtain, for a network element of the passive optical network, an identifier and ranging information corresponding to a present location of the network element; identify, from a database and based on the identifier of the network element, stored ranging information specifying a previous location of the network element; determine, based on a comparison of the ranging information with the stored ranging information, that the location of the network element has changed more than a specified amount; and output an alert in response to determining that the location of the network element has changed more than a specified amount.

Another innovative aspect of the subject matter described in this specification can be embodied in a system that includes at least one network element of an optical network; and a network distribution element of the optical network including one or more data processing devices configured to: obtain, for a network element of the passive optical network, an identifier and ranging information corresponding to a present location of the network element; identify, from a database and based on the identifier of the network element, stored ranging information specifying a previous location of the network element; determine, based on a comparison of the ranging information with the stored ranging information, that the location of the network element has changed more than a specified amount; and output an alert in response to determining that the location of the network element has changed more than a specified amount.

These and other embodiments can each optionally include one or more of the following features. The network distributing element can include an optical line terminal (OLT) and the network element can include one or more of an optical network unit (ONU), an optical network terminal (ONT), or customer-premises equipment (CPE). The ranging information can include one or both of delay information or distance information between the network element and a network distribution element. Outputting an alert can include sending an alarm signal to alert a service provider that the location of the network element has changed more than the specified amount. Determining that the location of the network element has changed more than a specified amount can include determining that the ranging information differs from the stored ranging information by more than a threshold that corresponds to a specified distance. Obtaining ranging information of a network element can include: transmitting a ranging request to the network element; receiving a ranging response from the network element; determining a round-trip delay between transmitting the ranging request and receiving the ranging response; and determining the ranging information based on the round-trip delay.

Methods can include the action of disabling communication with the network element based on the determination that the location of the network element has changed more than the specified amount. Methods can include the action of determining, based on updated ranging information that the network element has been returned to a location that is within a specified distance of a location corresponding to the stored ranging information; and enabling communication with the network element.

Particular embodiments of the subject matter described in this specification can be implemented so as to realize one or more of the following advantages. The example techniques can permit better control and operation of the system, for example, by enabling the network distribution node or service provider to detect location changes of customer-premises equipment (CPE) and offering the service provider or network administrator different options to control and manage the CPE. The example techniques can provide enhanced security to the network and prevent customers or others from moving and using a CPE at unauthorized locations. The example techniques make use of existing system infrastructures and protocols and add an extra layer of security protection, without requiring additional hardware cost. The example techniques can be implemented as an automated process or application compatible with various network protocols and can be efficiently implemented and executed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
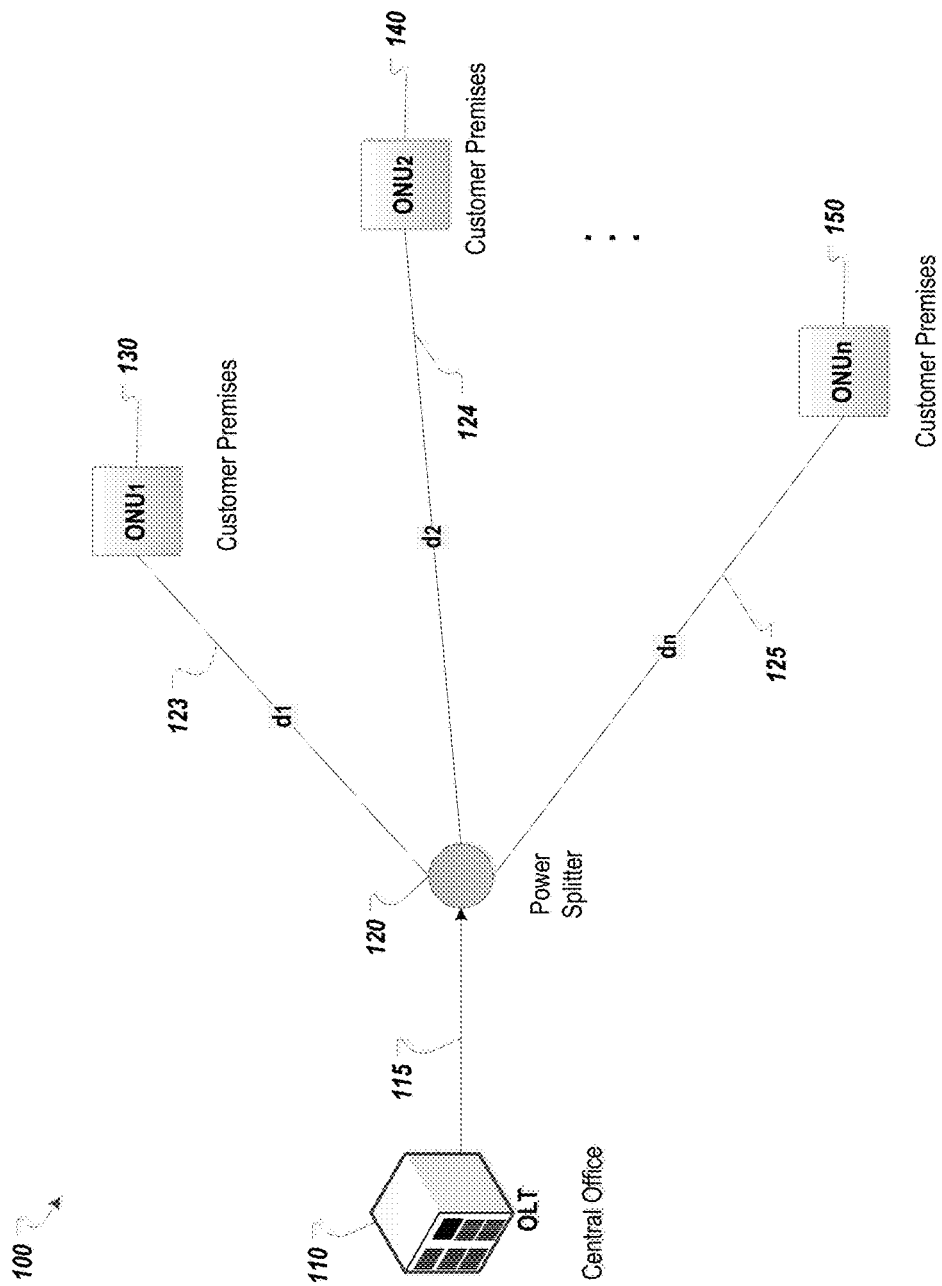
FIG. 1 is a block diagram showing aspects of an example telecommunications network.

A passive optical network (PON) can include one or more network distribution elements (or central office nodes), a number of network elements or user nodes, and one or more unpowered optical splitters that enable a single optical fiber to serve multiple customer premises. In a typical scenario, a PON includes an optical line terminal (OLT) at a service provider's central office. Using a splitter, the OLT is coupled to a number of optical network units (ONUs) or optical network terminals (ONTs) near end users, forming a point-to-multipoint network. For example, in the case of Gigabit Passive Optical Network (GPON), an OLT card can include 64 splits onto a single OLT port. The point-to-multipoint architecture reduces the amount of fiber and central office equipment required compared with point-to-point architectures. However, without a one-to-one mapping between an OLT port and customer-premises equipment (CPE), a service provider or a network administrator may not be able to fully capture configuration changes of one or more ONUs within the same OLT port. For example, a customer could carry her/his CPE modem to another location in the neighborhood and plug the modem into the same OLT port, without being differentiated by the OLT. Such changes may pose security risks and other issues to the network.

Example techniques are disclosed in this document to provide enhanced security and control of the network and to limit the possibility of using a CPE at a location that is beyond an authorized or allowed location range for the CPE. For example, example techniques discussed in this document enable the OLT or the service provider to detect that a customer has moved a CPE modem from his house (where the CPE modem was registered) and is using the modem at another house in the neighborhood. The example techniques can disable the CPE modem (e.g., by rejecting its registration to the network) when use the modem is attempted at the other house. As such, the example techniques can require subscriber devices to be used only within the authorized location range and thus ensure the security provisions of the subscriber device and the network.

The example techniques exploit ranging information obtained from ranging procedures to determine whether a particular CPE has been moved outside of the authorized location range for that particular CPE. For example, during the ranging phase of an activation or registration process, an ONT can generate a ranging response (or range response) in response to a ranging request (or range request) from an OLT. By retrieving the range delay information from each ONT on the PON, a distance of the ONT to the OLT can be determined. A registration of the ONT serial number, MAC address or other unique identifying label could be matched against the stored ranging information to determine if there is a change between the current ONT location (e.g., derived based on the range delay information) and the previous ONT location (e.g., derived based on the stored ranging information). If the change exceeds a threshold, an alert can be generated to notify the service provider that location change of the ONT is outside of an acceptable range or geographic area. In some instances, the registration of the ONT can be rejected and subsequent communication with the ONT can be disabled when it is determined that the ONT has been moved outside of the acceptable range. As such, the use of the ONT or other CPE is restricted within an allowed or specified range (e.g., as authorized during registration), preventing the ONT or other CPE from being moved to another location outside the acceptable range or geographic area.

The example techniques described herein can be implemented as methods, computer program products, apparatus, devices, etc., for example, to improve the management and control capabilities of a telecommunications network and improve security of the network equipment and services. The example techniques can be applied to a PON, or another telecommunications network in which customer premises equipment has ranging information in a shared communication channel.

Throughout this document the terms downlink, downstream (DS) and downstream communications are used to refer to communications transmitted toward the end user, while the terms uplink, upstream (US) and upstream communications are used to refer to communications transmitted toward the service provider (e.g., a telecommunications service provider's central office).

The discussion that follows with reference to FIG. 1 introduces components of an example telecommunications network that can perform the example techniques for limiting move and use of a network element outside an authorized location range based on ranging information of the network element. The description referencing FIG. 2 relates to an example ranging process that can be implemented by the example network of FIG. 1 to obtain ranging information of one or more network elements. The description referencing FIG. 3 provides details regarding an example method for determining whether to disable communication with a network element based on the ranging information of the network element, thus enforcing the network element to be used within an authorized location.

FIG. 1 is a block diagram showing aspects of an example telecommunications network 100. The example network 100 can be, for example, a passive optical network (PON), active optical network (AON), or another type of network that provides network services using optical fiber. The example network 100 includes a network distribution element 120 at a central office, a remote node 120, and a number of network elements 130, 140, and 150 at customer sites. In some implementations, a telecommunications network can include additional or different components and features and can be configured in a different manner (e.g., in bus, ring, or other topologies) than the example network 100 shown in FIG. 1.

The example telecommunications network 100 includes a PON. The PON includes an optical line terminal 110 (OLT, also referred to as an optical line termination) as an example network distribution element at the central office, a splitter as an example remote node 120, and multiple optical network units (ONUs) as example network elements 130, 140, and 150 at the customer premises. In some implementations, the OLT 110 can be coupled to the Internet, a public switched telephone network (PSTN), a data server, a video server, or additional or different networks. The OLT 120, as a network distribution element, provides the interface between the PON and a service provider's core network, serving as the service provider endpoint of the PON. The OLT 110 transmits downstream data traffic to ONUs (e.g., ONUs 130, 140, and 150), and receives upstream data traffic from the ONUs.

Each ONU can include or otherwise coupled to one or more customer-premises equipment (CPE) or subscriber devices (e.g., CPE modems). The ONU is a device that terminates the PON and presents customer service interfaces to the user. For example, the ONU terminates the optical fiber transmission and can transform incoming optical signals into electrical signals adapted to subscriber devices. An optical network terminal (ONT) is generally an ONU that serves a single subscriber.

In some implementations, a single OLT can serve a number of ONUs at different customer locations. As illustrated in FIG. 1, the OLT 110 is coupled with n ONUs (e.g., $ONU_1$ 130, $ONU_2$ 140, and $ONU_n$ 150). n can be 32, 64, 128, or another number. For example, an OLT card of GPON can include 64 splits onto a single OLT port. The multiple ONUs can each be at a respective distance from the OLT. In the example illustrated in FIG. 1, the distances from the $ONU_1$ 130, $ONU_2$ 140, and $ONU_n$ 150 to the splitter 120 are $d_1$ 123, $d_2$ 124, and $d_n$ 125, respectively. The different distances can lead to different propagation delays during data transmissions between the ONUs 130-150 and the OLT 110. To establish upstream synchronization, each ONU performs a ranging procedure when it joins and registers with the network. The ranging procedure can be performed to determine and account for the respective propagation delay of communications for each ONU, thus avoiding data collision of upstream transmissions from the multiple ONUs that communicate with a single OLT 110.

The ranging information obtained from the ranging process can, in turn, provide location information of the ONU. For example, optical signal delay in 1 km of fiber can be approximately 5 us, such that the round-trip time (RTT) for a 20 km distance difference between two ONU locations may be approximately 200 us. As such, the propagation delay provided in ranging information can be used to detect a location change of an ONU.

To provide enhanced security and limit unauthorized use of an ONU at an unregistered location, the OLT 110, the ONUs 130-150, or another device connected to the network 100 can implement a method that detects the location change of an ONU based, for example, on changes to the ranging information of the ONU. The OLT 110 or the service provider can alert and disable communication with the ONU if the ONU has been moved outside its authorized location range. For example, if the propagation delay specified in the ranging information for a particular ONU indicates that the particular ONU has been moved more than a specified distance from the original location at which the particular ONU was registered, the OLT 110 can prevent registration of the particular ONU, or otherwise prevent communications with the particular ONU.

Figure 2:
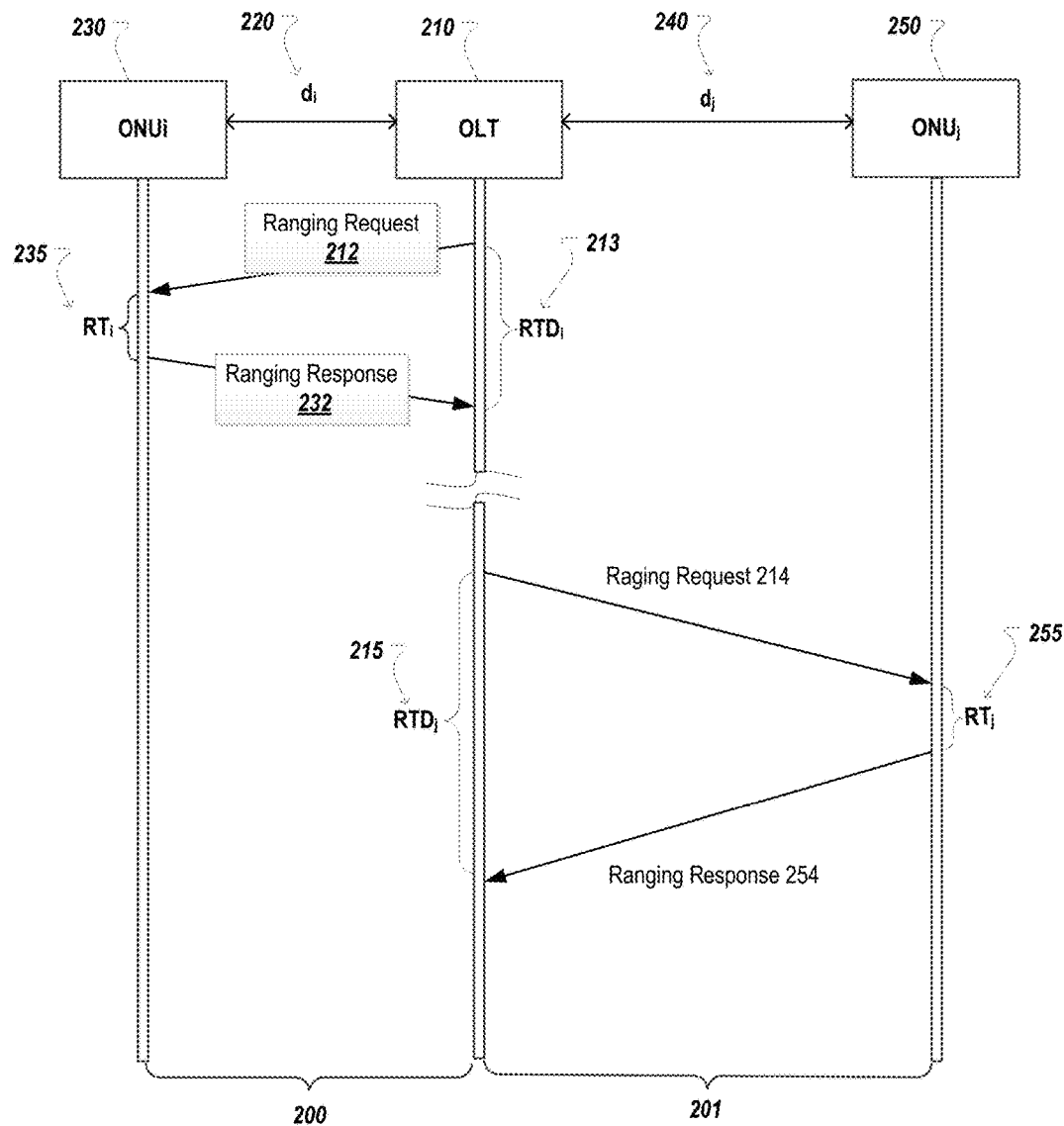
FIG. 2 is a block diagram showing aspects of example ranging processes of network elements of a telecommunications network.
Figure 3:
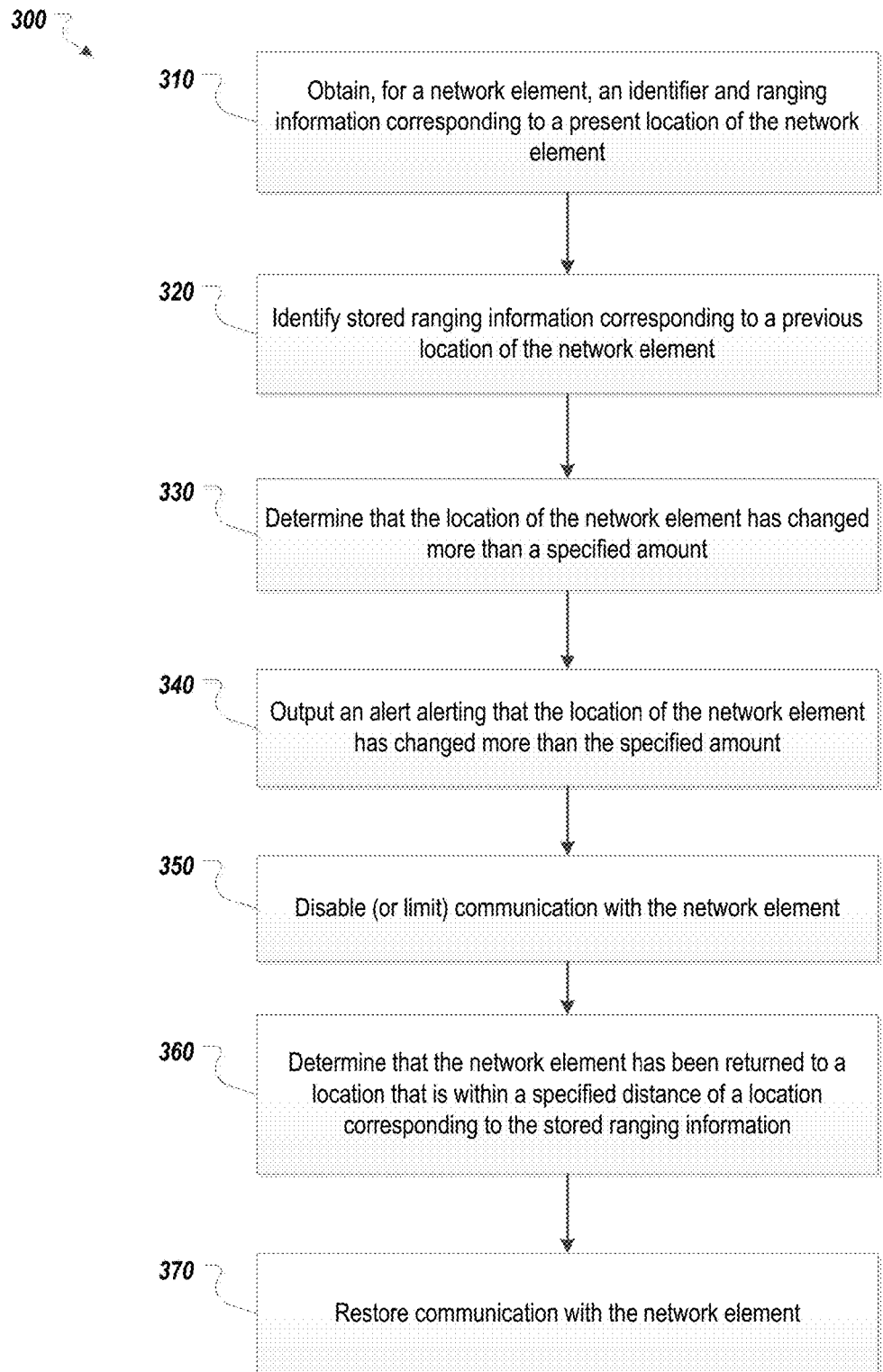
FIG. 3 is a flow chart of an example process for granting communication with a network element based on ranging information of the network element.

FIG. 2 is a block diagram showing aspects of example ranging procedures 200 and 201 for obtaining ranging information of network elements 230 and 250, respectively. The network elements 230 and 250 can be network elements (e.g., $ONU_1$ 130, $ONU_2$ 140, and $ONU_n$ 150) of a telecommunications network (e.g., the example telecommunications network 100 in FIG. 1), or they can include other network devices.

Ranging procedures can be performed between a network distribution element (e.g., an OLT) and a network element (e.g., an ONU, OLT, CPE, etc.). The ranging procedure can be performed, for example, when a network element joins the telecommunication network, or it can be performed regularly or periodically. The ranging procedure can be initiated by the network distribution element, for example, for the purpose of network discovery, or the ranging procedure can be initiated by the network element, for example, by sending a request to join the network when the network element is powered on. In some implementations, a ranging procedure for a network element can be performed by muting (halting communications of) other network elements to avoid interference. For instance, the ranging procedure 200 for $ONU_i$ 230 can be performed at a different time than the ranging procedure 201 for $ONU_j$ 250 such that the transmitted ranging messages (e.g., ranging request and response) are not affected by transmissions from another ONU or device.

As illustrated in FIG. 2, the example ranging procedure 200 is performed between the network distribution element OLT 210 and the network element $ONU_i$ 230. The OLT 210 sends a ranging request 212 to the $ONU_i$ 230. Upon receiving the ranging request 212, $ONU_i$ 230 may take a response time (RT) $RT_i$ 235 for processing and then sends a ranging response 232 to the OLT 210. The round-trip delay (RTD) or round-trip time (RTT) $RTD_i$ 213 between the OLT 210 sending the ranging request 212 and receiving the ranging response 232 can be determined, for example, by using an internal counter or timer. In some implementations, a RTD can be defined by accounting only the propagation delay without the response time delay that is associated with the $ONU_i$ 230 generating a response to the ranging request 212 (e.g., calculated by $RTD_i$ 213-$RT_i$ 235).

In some implementations, the respective one-way transmission delay for the ranging request 212 and the ranging response 232 can be determined. In some implementations, an equalization time or equalization delay (EqD) can be determined. The equalization delay can be used by an ONU to adjust its upstream data transmission such that upstream data transmission from all ONUs will arrive in order without collision. The equalization delay can be determined, for example, based on a reference time common for multiple ONUs and the RTD specific for the considered ONU. Additional or different time information can be obtained.

Similarly, ranging information of $ONU_j$ 250 can be determined based on the ranging procedure 201 performed by the OLT 210 and the $ONU_j$ 250. For example, round-trip delay $RTD_j$ 215 between the OLT 210 and the $ONU_j$ 250 can be determined. In this example, the OLT 210 sends the ranging request 214 to the $ONU_j$ 250 and receives the ranging response 254 from the $ONU_j$ 250. Additionally or alternatively, response time $RT_j$ 255, the respective one-way transmission time for the ranging request 214 and the ranging response 254, equalization delay for the $ONU_j$ 250, or other types of ranging information can also be determined.

The time information obtained from the ranging procedure corresponds to a present location of a network element because the transmission delay depends on the distance between the current locations of the network element and the network distribution element. As such, distance or location information of a network element can be determined based on the ranging time information. For instance, the distance $d_i$ 220 between the $ONU_i$ 230 and OLT 210 can be approximated or otherwise determined based on the $RTD_i$ 213, the respective one-way transmission time for the ranging request 212 and the ranging response 214, or other time ranging information of the $ONU_i$ 230. For example, the $d_i$ 220 can be approximated by $RTD_i$ 213 divided by the speed of light ($3 \times 10^8$ m/s) or another factor that quantifies the relationship between the distance and the delay. Similarly, the distance $d_j$ 240 between the $ONU_j$ 250 and OLT 210 can be approximated or otherwise determined based on the time information obtained from the ranging procedure 201 of the $ONU_j$ 250. The distance difference between $d_i$ 220 and $d_j$ 240 can be reflected, determined, or approximated based on the time difference between $RTD_i$ 213 and $RTD_j$ 215, for instance.

In some implementations, information obtained from, or determined based on, the ranging procedure can be stored, for example, in database associated with the $ONU_i$ 230, $ONU_j$ 250 and OLT 210 for use in subsequent communications between the ONUs and the OLT. For example, the ranging information (e.g., the RTD, equalization delay, etc.) can be obtained from the ranging procedure during an activation or registration process of an ONU. By storing the identified ranging information in a registration database, the ONU is able to retrieve or otherwise determine and apply the proper equalization delay for subsequent upstream data transmissions.

In some instances, the ranging procedure can be repeated and the ranging information can be updated. The database can update the ranging information accordingly. Alternatively or additionally, the database may add the updated ranging information while keeping the stored initial ranging information (e.g., obtained when the network element first join the network). Other operations can be performed for updating and managing the ranging information in the database. In some implementations, additional or different operations can be performed in a ranging procedure.

In some implementations, as discussed in more detail with reference to FIG. 3, the ranging information stored in the database can be used to determine if a particular ONU has been relocated to a new location. For example, assume that when $ONU_j$ 250 is initially registered, the ranging information indicates that $ONU_j$ 250 is at a distance dj from the OLT 210, and that this information is stored in the database. Further assume that in a subsequent ranging procedure, newly obtained ranging information indicates that the $ONU_j$ 250 is located at a distance $d_y$ from the OLT 210. In this example, if the distance $d_y$ is more than a specified distance away from dj, a determination can be made that the $ONU_j$ (or another CPE) has been relocated to a different location, and communications with the $ONU_j$ can be halted or limited.

FIG. 3 is a flow chart of an example process 300 for disabling and enabling communication with a network element of a telecommunications network based on ranging information of the network element. The telecommunications network can include, for example, a PON, an AON, or another type of communication network. The network element can include, for example, an ONU, ONT, or other CPE device at the customer premises.

The process 300 can be implemented, for example, as computer instructions stored on computer-readable media and executable by data processing apparatus, such as one or more processors of a device within a telecommunications network discussed above with respect to FIGS. 1 and 2). For example, the process 300 can be implemented by one or more of the OLTs 110 and 210, ONUs 130, 140, 150, 230 and 250, or other devices in FIGS. 1 and 2.

The example process 300, individual operations of the process 300, or groups of operations may be iterated or performed simultaneously (e.g., using multiple threads). In some cases, the example process 300 may include the same, additional, fewer, or different operations performed in the same or a different order.

The example process 300 can be performed, for example, during an initialization or reconfiguration of a telecommunications network, a power-up or restart of a network element, or any other stages of the telecommunications network. In some implementations, the example process 300 can be performed regularly (e.g., at specified intervals for network discovery or system maintenance) or from time to time (e.g., upon a request of a service provider or a network administrator).

An identifier and ranging information for a network element of the passive optical network is obtained (310). The identifier of the network element can include, for example, a serial number, a media access control address (MAC address), a burned-in address (BIA), an Ethernet hardware address (EHA), hardware address, physical address or any other identifier that uniquely identifies the network element. The identifier can be assigned, for example, by a network distribution element, a device manufacture, or another entity.

The identifier can be obtained by a network distribution element, for example, by retrieving information from a message or data packet (e.g., from a header or a dedicated message) transmitted from the network element, or by mapping a network address (e.g., an IP address) of the network element into the identifier (e.g., a MAC address) of the network element, or in another manner.

The ranging information can include, for example, time information, distance or location information, or other information corresponding to a present location of the network element. The ranging information can be obtained, for example, based on a ranging process as described with respect to FIG. 2 or in another manner. For example, the ranging information can include one or more of a round-trip delay, one-way propagation delay, an equalization delay, a round-trip distance, a one-way distance, or other time or location information. In some implementations, the ranging information can include the identifier information of the network element (e.g., the serial number or MAC address of the network element).

Stored ranging information of the network element can be identified from a database based on the identifier of the network element (320). The stored ranging information can indicate a previous location of the network element. In some instances, the stored ranging information can be the ranging information obtained during an activation or registration procedure when the network element first joined the network. As such, the stored ranging information can indicate a registered location of the network element acknowledged or authorized by the network distribution element. In some other instances, the stored ranging information can be the ranging information obtained from a previous ranging procedure and thus corresponds to a location of the network element (e.g., a distance from an ONT) when the previous ranging procedure was performed.

The previous location of the network element can be used as an authorized location for the network element. For example, the original location of the network element upon joining the network can be considered as the default authorized location, and the network element may be authorized for use within a specified distance of the reference location, as indicated by a specified tolerance range. The tolerance range (e.g., with a distance of 50 feet from the authorized location) can be configured, for example, by the service provider, to allow use of the network element at locations that are within the tolerance range (e.g., allowing a customer to move a CPE modem within the customer's home or office building).

The stored ranging information can be retrieved from a database, for example, based on the identifier of the network element, by matching the identifier of the network element against all network element identifiers stored in the database. If no matched identifier is found, the database may store the identifier of the network element and register the ranging information obtained at step 310 as an initial set of ranging information for the network element. If a matched identifier is found, the stored ranging information can be retrieved and compared with the ranging information obtained at step 310.

In some instances, a determination is made that the location of the network element has changed more than a specified amount, for example, based on a comparison of the ranging information with the stored ranging information (330). The comparison can include a determination of whether the ranging information differs from the stored ranging information by more than a threshold that corresponds to a specified distance. The threshold can be a time threshold, a distance threshold, or another threshold depending on the type of ranging information that is stored.

For example, if the ranging information includes a current distance between the current locations of the network element and the network distribution element and the stored ranging information includes a previous distance between the previous locations of the network element and the network distribution element, then the threshold can be an amount of distance (e.g., 50 feet, 100 meters, etc.). In another example, if the ranging information includes a current round-trip delay and the stored ranging information includes a previous round-trip delay between the network element and the network distribution element, then the threshold can be an amount of time (e.g., 50.8 ns, 0.33 μs, etc.).

In some implementations, the types of information in the stored ranging information and the ranging information obtained at step 310 may be different. For instance, if the stored ranging information includes an equalization delay, while the obtained ranging information at step 310 includes a present distance between the OLT and ONU, then one or both of the sets of ranging information can be converted to a same type of information and then compared.

In some implementations, the threshold can be configured, for example, by the network distribution unit or the network service provider based on a desired distance resolution, measurement accuracy, or other factors. For instance, if the service provider wants to distinguish any location change of a user node beyond 50 feet, then the threshold can be configured to be around 50 feet or 50.8 ns (i.e., 50 feet divided by the speed of light) depending on whether the threshold is measured in a distance or in time. The configuration of the threshold can also take into account any measurement accuracy, temperature change, clock drift, etc. to avoid false alarm or too restricted tolerance range. In some implementations, the threshold can be stored in the database, or it can be updated and provided by the service provider when the example process 300 is executed.

In some instances, if the comparison shows that the difference between the ranging information and the stored ranging information is less than or equal to the threshold, then it can be determined that the present location of the network element is within the allowed or authorized location range and thus communication with the network element can be provided or otherwise enabled. In some instances, if the comparison shows that the difference between the ranging information and the stored ranging information exceeds the threshold, it can be determined that the location of the network element has changed more than a specified amount (e.g., the network element has moved outside its authorized range).

In response to determining that the location of the network element has changed more than a specified amount, an alert specifying that the location of the network element change has changed can be output (340). In some implementations, the alert can be sent to a service provider to notify that the location of the network element has changed more than the specified amount (e.g., moved beyond the tolerance range). The alert can further include a request for the service provider's instructions for subsequent actions towards the network element (e.g., whether to disable communication with the network element).

In some implementations, the alert can be sent to the network element to notifying the customer that the network element has been moved outside its authorized location range. In some instances, the alert to the customer can further include information regarding the current location of the network element, instructions to relocate the network element back to the authorized location range, warnings of potential disconnection of network service or penalty (e.g., surcharge) if proper actions have not been taken within specified time duration (e.g., several minutes or hours), or other information. In some implementations, the alert can be sent to other nodes (e.g., other OLTs and remote nodes coupled to the network element) in the telecommunications network, for example, to instruct the other nodes to suspend or stop transmissions with the network element.

Communication with the network element can be disabled (or limited) (350). Disabling communication with the network element can include, for example, suspending or terminating downstream/uplink transmissions to/from the network element, rejecting registration of the network element with the network distribution element, or other operations. The communication can be disabled in response to determining that the location of the network element has changed more than the specified amount at step 330, in response to outputting alert at step 340, in response to receiving the service provider's instructions, in response to determining no proper action has been taken by the customer after the specified time duration, or in response to other conditions.

In some implementations, only specified types of communication are disabled, or restricted, so that certain types of communication can still occur. For example, messages informing the customer that the network element needs to be returned to its previous location can be provided. Additionally, or alternatively, the network element can remain capable of facilitating communications between the service provider and the customer.

In some implementations, updated ranging information for the network element can be received, and it can be determined that the network element has been returned to a location that is within a specified distance of a location corresponding to the stored ranging information based on updated ranging information (360). The updated ranging information can include information obtained based on a new ranging procedure performed for the network element. The updated ranging information can include the same or different types of information as the previous obtained ranging information. The determination can be made, for example, based on a comparison between the updated ranging information and the stored ranging information in a similar or different manner as described with respect to step 330.

In some implementations, in response to determining that the network element has been returned to a location that is within a specified distance of a location corresponding to the stored ranging information, communication with the network element can be enabled (370). Enabling communication with the network element can include, for example, starting or resuming downstream/uplink transmissions to/from the network element, completing registration of the network element with the network, storing the updated ranging information into the registration database, and other operations.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The operations described in this specification can be implemented as operations performed by a data processing device on data stored on one or more computer-readable storage devices or received from other sources.

The term "data processing device" encompasses all kinds of apparatus, devices, and machines for processing data, including by way of example a programmable processor, a computer, a system on a chip, or multiple ones, or combinations, of the foregoing, as well as telecommunications equipment that may include one or more data processing devices. The data processing device can include special purpose logic circuitry, e.g., an FPGA (field programmable gate array) or an ASIC (application specific integrated circuit). The data processing device can also include, in addition to hardware, code that creates an execution environment a computer program, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    obtaining, for a network element of a passive optical network, an identifier and ranging information corresponding to a present distance between a first geographic location where the network element is connected to the passive optical network and an optical line terminal (OLT);
    identifying, from a database and based on the identifier of the network element, stored ranging information corresponding to a previous distance between a second geographic location where the network element was previously connected to the passive optical network and the OLT;
    determining, based on a comparison of the obtained ranging information corresponding to the present distance between the first geographic location and the OLT with the identified stored ranging information corresponding to the previous distance between the second geographic location and the OLT, that the present distance between the first geographic location and the OLT has changed from the previous distance between the second geographic location and the OLT by more than a specified amount and the network element is connected to the passive optical network at an unauthorized location; and
    outputting an alert in response to determining that the present distance between the first geographic location and the OLT has changed from the previous distance between the second geographic location and the OLT by more than the specified amount and the network element is connected to the passive optical network at the unauthorized location.

2. The method of claim 1, wherein the ranging information comprises one or both of delay information or distance information between the network element and a network distribution element.

3. The method of claim 1, wherein outputting the alert comprises sending an alarm signal to alert a service provider that the present distance between the first geographic location and the OLT has changed from the previous distance between the second geographic location and the OLT by more than the specified amount.

4. The method of claim 1, further comprising disabling communication with the network element based on the determination that the present distance between the first geographic location and the OLT has changed from the previous distance between the second geographic location and the OLT by more than the specified amount and the network element is connected to the passive optical network at the unauthorized location.

5. The method of claim 1, wherein determining that the present distance between the first geographic location and the OLT has changed from the previous distance between the second geographic location and the OLT by more than the specified amount comprises determining that the ranging information differs from the stored ranging information by more than a threshold that corresponds to a specified distance.

6. The method of claim 1, comprising:
    determining, based on updated ranging information that the network element has been returned to a third geographic location that is within a specified distance of the second geographic location corresponding to the stored ranging information; and enabling communication with the network element.

7. The method of claim 1, wherein obtaining the ranging information of the network element comprises:
transmitting a ranging request to the network element;
receiving a ranging response from the network element;
determining a round-trip delay between transmitting the ranging request and receiving the ranging response; and
determining the ranging information based on the round-trip delay.

8. A device, comprising:
a memory storing identifiers and ranging information of at least one network element of a passive optical network; and
one or more optical network devices that interact with the memory and execute instructions that cause the device to be configured to:
obtain, for a network element among the at least one network element of the passive optical network, an identifier and ranging information corresponding to a present distance between a first geographic location where the network element is connected to the passive optical network and an optical line terminal (OLT);
identify, from a database and based on the identifier of the network element, stored ranging information specifying a previous distance between a second geographic location where the network element was previously connected to the passive optical network and the OLT;
determine, based on a comparison of the obtained ranging information corresponding to the present distance between the first geographic location and the OLT with the identified stored ranging information corresponding to the previous distance between the second geographic location and the OLT, that the present distance between the first geographic location and the OLT has changed from the previous distance between the second geographic location and the OLT by more than a specified amount and the network element is connected to the passive optical network at an unauthorized location; and
output an alert in response to determining that the present distance between the first geographic location and the OLT has changed from the previous distance between the second geographic location and the OLT by more than the specified amount and the network element is connected to the passive optical network at an unauthorized location.

9. The device of claim 8, wherein the ranging information comprises one or both of delay information or distance information between the network element and a network distribution element.

10. The device of claim 8, wherein the device configured to output the alert comprises the device configured to send an alarm signal to alert a service provider that the present distance between the first geographic location and the OLT has changed from the previous distance between the second geographic location and the OLT by more than the specified amount.

11. The device of claim 8, further configured to disable communication with the network element based on the determination that the present distance between the first geographic location and the OLT has changed from the previous distance between the second geographic location and the OLT by more than the specified amount and the network element is connected to the passive optical network at the unauthorized location.

12. The device of claim 8, wherein the device configured to determine that the present distance between the first geographic location and the OLT has changed from the previous distance between the second geographic location and the OLT by more than the specified amount comprises the device configured to determine that the ranging information differs from the stored ranging information by more than a threshold that corresponds to a specified distance.

13. The device of claim 8, further configured to:
determine, based on updated ranging information that the network element has been returned to a third geographic location that is within a specified distance of the second geographic location corresponding to the stored ranging information; and
enable communication with the network element.

14. The device of claim 8, wherein the device configured to obtain the ranging information of the network element comprises the device configured to:
transmit a ranging request to the network element;
receive a ranging response from the network element;
determine a round-trip delay between transmitting the ranging request and receiving the ranging response; and
determine the ranging information based on the round-trip delay.

15. A system, comprising:
at least one network element of an optical network;
an optical line terminal (OLT) that is connected to the optical network; and
a network distribution element of the optical network including one or more data processing devices configured to:
obtain, for a network element among the at least one network element of the optical network, an identifier and ranging information corresponding to a present distance between a first geographic location where the network element is connected to the optical network and the OLT;
identify, from a database and based on the identifier of the network element, stored ranging information specifying a previous distance between the a second geographic location where network element was previously connected to the optical network and the OLT;
determine, based on a comparison of the obtained ranging information corresponding to the present distance between the first geographic location and the OLT with the identified stored ranging information corresponding to the previous distance between the second geographic location and the OLT, that the present distance between the first geographic location and the OLT has changed from the previous distance between the second geographic location and the OLT by more than a specified amount and the network element is connected to the optical network at an unauthorized location; and
output an alert in response to determining that the present distance between the first geographic location and the OLT has changed from the previous distance between the second geographic location and the OLT by more than the specified amount and the network element is connected to the optical network at the unauthorized location.

16. The system of claim 15, wherein the network distributing element comprises the optical line terminal (OLT) and the network element comprises one or more of an optical network unit (ONU), an optical network terminal (ONT), or customer-premises equipment (CPE).

17. The system of claim 15, wherein the ranging information comprises one or both of delay information or distance information between the network element and the network distribution element.

18. The system of claim 15, wherein the one or more data processing devices configured to output the alert comprises the one or more data processing devices configured to send an alarm signal to alert a service provider that the present distance between the first geographic location and the OLT has changed from the previous distance between the second geographic location and the OLT by more than the specified amount.

19. The system of claim 15, the one or more data processing devices further configured to disable communication with the network element based on the determination that the present distance between the first geographic location and the OLT has changed from the previous distance between the second geographic location and the OLT by more than the specified amount and the network element is connected to the optical network at the unauthorized location.

20. The system of claim 15, wherein the one or more data processing devices configured to determine that the present distance between the first geographic location and the OLT has changed from the previous distance between the second geographic location and the OLT by more than the specified amount comprises the one or more data processing devices configured to determine that the ranging information differs from the stored ranging information by more than a threshold that corresponds to a specified distance.

21. The system of claim 15, the one or more data processing devices further configured to:
  determine, based on updated ranging information that the network element has been returned to a third geographic location that is within a specified distance of the second geographic location corresponding to the stored ranging information; and
  enable communication with the network element.

22. The system of claim 15, wherein the one or more data processing devices configured to obtain the ranging information of the network element comprises the one or more data processing devices configured to:
  transmit a ranging request to the network element;
  receive a ranging response from the network element;
  determine a round-trip delay between transmitting the ranging request and receiving the ranging response; and
  determine the ranging information based on the round-trip delay.

* * * * *